March 13, 1928.
H. C. CLAY
1,662,660
CONTROLLER FOR VARIABLE SPEED TRANSMISSION
Filed Feb. 25, 1927   2 Sheets-Sheet 1
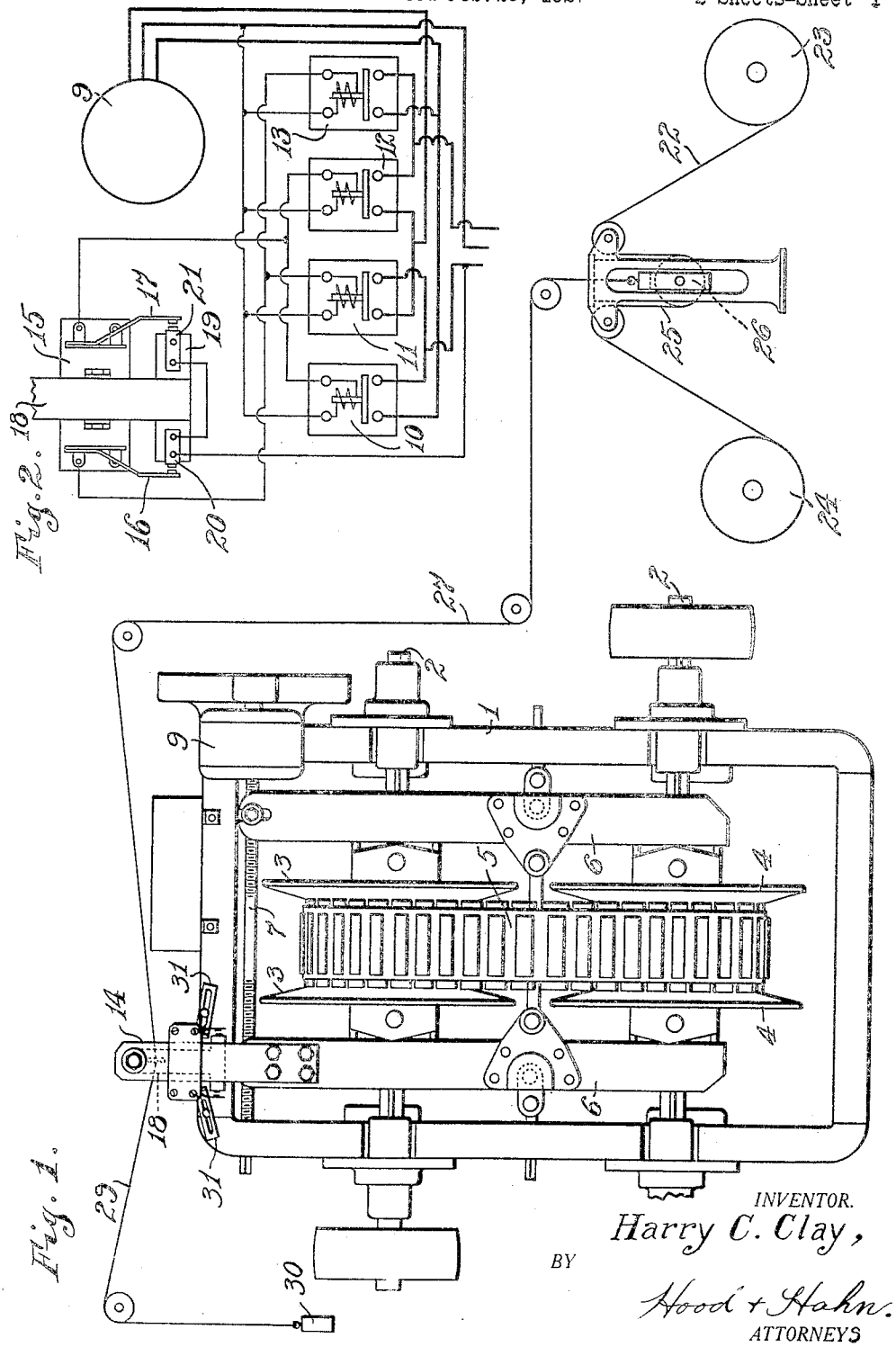
INVENTOR.
Harry C. Clay,
BY
Hood + Hahn.
ATTORNEYS March 13, 1928.

H. C. CLAY

CONTROLLER FOR VARIABLE SPEED TRANSMISSION

Filed Feb. 25, 1927

INVENTOR.
Harry C. Clay,
BY
Hood + Hahn.
ATTORNEYS

Patented Mar. 13, 1928.

1,662,660

UNITED STATES PATENT OFFICE.

HARRY C. CLAY, OF COLUMBUS, INDIANA, ASSIGNOR TO REEVES PULLEY COMPANY, OF COLUMBUS, INDIANA, A CORPORATION OF INDIANA.

CONTROLLER FOR VARIABLE-SPEED TRANSMISSION.

Application filed February 25, 1927. Serial No. 171,017.

My invention relates to means for controlling the operation of speed varying transmission. It is particularly applicable to that type of speed varying transmission commercially known as the "Reeves" transmission and one of the objects of the invention is to provide means for electrically controlling the operation of said transmission so that the transmission will operate the driven mechanism at different speeds depending upon the requirements.

For the purpose of disclosing my invention I have illustrated certain embodiments thereof in the accompanying drawings in which Fig. 1 is a schematic view showing the application of my invention;

Fig. 2 is a diagrammatic view of the circuit arrangement;

Figure 3:
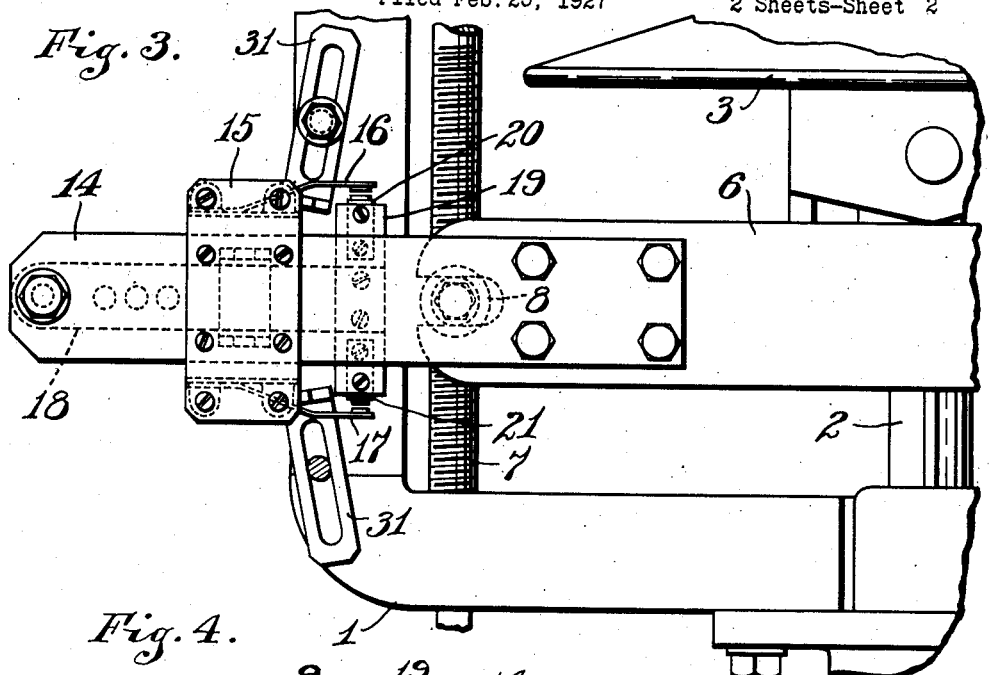
Fig. 3 is a detail plan of the controller switch and associated parts.
Figure 4:
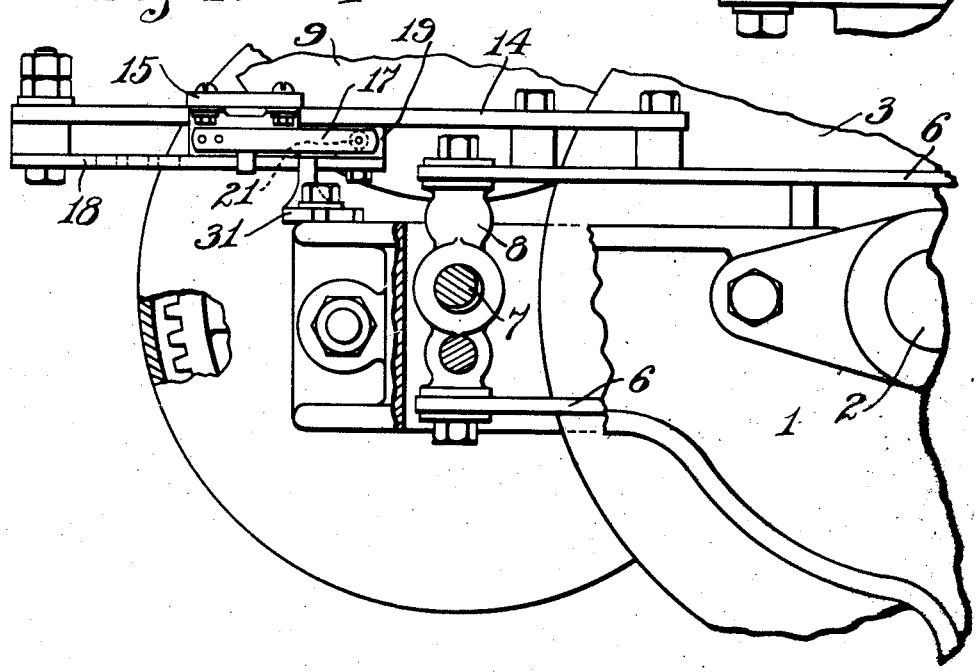
Fig. 4 is a detail side elevation partly in section.

In the embodiment illustrated I provide a Reeves transmission which in this type of speed varying transmission is provided with a frame 1 having mounted therein suitable shafts 2, 2 on which are mounted two pairs of friction cones 3, 3 and 4, 4 connected by a belt 5. A pair of levers 6, 6 is provided which engage the cones to position them toward or from each other for varying the speed of the driven member and these levers are operated by a threaded controlling shaft 7 carrying nuts 8 which engage the levers to swing the same in opposite directions about their pivots. The levers are simultaneously swung in opposite directions about their pivots by the rotation of the shaft 7, due to the fact that the ends of the shaft engaging the nuts for the respective levers are oppositely threaded so that when the shaft is rotated in one direction the ends of the levers connected with the nuts will be simultaneously drawn inwardly and when the shaft is rotated in the opposite direction they will be moved simultaneously away from one another.

The controlling shaft 7 is driven by a reversible electric motor 9 which may be directly connected to the shaft or, if desired, may be connected thereto through suitably interposed gearing. This motor, in the structure illustrated, is of the three phase type and its circuit is controlled through suitable solenoid switches 10, 11, 12 and 13, the circuits through the solenoid windings of which are in turn controlled by a switch mounted on one of the levers 6.

In mounting the controlling switch one of the levers 6 is provided with an extension arm 14 which carries a suitable insulating block 15 provided at its opposite ends with spring contact fingers 16 and 17. Pivotally mounted at the outer extremity of the arm 14 is a swinging arm 18 pivoted at its outer end and having its inner end free to move. This arm is provided with a suitable insulating block 19 which carries on its two sides contacts 20 and 21 adapted to move respectively into engagement with the contacts 16 and 17 for the purpose of closing the circuit through the solenoid switches of the electric motor to cause the motor to operate in one direction or the other. The movable switch arm 18 may be conveniently operated through any instrumentality and in the structure illustrated this arm is adapted to be operated in accordance with the bight in a paper web. In the diagrammatic view the web 22 is being delivered from a roll 23 and transferred to a roll 24 which may be assumed to be driven by the speed varying transmission. In passing from the roll 23 to the roll 24 a bight 25 is formed in the web 22 in which rests an idler roll 26 capable of vertical movement. This vertical movement is imparted to the roll by the variation in the size of the bight which is caused by the roll 24 taking up the web 22 at a greater speed or less speed than it is delivered from the roll 23. In other words, if the web 22 is being delivered from the roll 23 at a greater speed than it is being taken by the roll 24 there will be a tendency for the bight 25 to increase in depth thereby lowering the roll 26 and vice versa. The roll 26 is connected by a suitable cable connection 27 with the movable controller arm 18 and this connection is opposed by a second cable connection 29 having at its end a counterweight 30.

In operation, in event the bight 25 lengthens, the weight of the roll 26 will swing the movable arm 18 in a direction to cause the contacts 16 and 20 to engage. This closes the circuit through the solenoid of the switches 10 and 12 causing the switches to operate to close the circuit through the motor 9 and operating the motor in a direction to cause the speed varying transmission to increase its speed drive of the roll 24 by rotating the shaft 7 and operating the levers 6, 6. As the roll 24 is being driven at a greater speed it will commence to take up the bight 25 thereby relieving the weight on the cable 27 so that the cables 27 and 29 will be in counter-balanced relation and continued movement of the controller arm 18 will cease. The rotation of the shaft 7 is such as to move the lever 6 in the direction in which the controller arm 18 has been moved and due to the fact that the free end of the controller arm 18 is held stationary by the counter-balanced relation of the cables 27 and 29, as the pivotal point of the controller arm 18 moves with the swinging of the lever 6 the contacts 16 and 20 will eventually be separated thereby stopping the motor and stopping further movement of the levers so that the speed varying transmission will continue to drive the roll 24 at its increased speed. The slowing down of the roll 24 is merely a reversal of the action above described. If the roll 24 is operating at too great a speed, the bight 25 will shorten thereby raising the roll 26 and the counterweight 30 will operate the cable 29 to swing the controller arm 18 in a direction to cause the contacts 21 and 17 to engage, thereby closing the circuit through the solenoids 11 and 13 thus causing the motor to operate in a reverse direction and swinging the levers 6, 6 to cause the transmission to operate the roller 24 at a slower speed.

It is thus seen that the speed varying transmission is automatically adjusted to drive the member intended to be driven thereby in accordance with the speed requirements and without undue "hunting" on the part of the transmission.

In order to prevent the motor from driving the shaft 7 to such an extent as to move the levers 6, 6 beyond their limits I provide adjustable stops 31 which are mounted on the frame and are adapted to engage the controller arm 18 to separate the contacts 16 and 20 or 21 and 17 when the levers 6, 6 reach the limit of their movement in either direction.

I claim as my invention:

1. The combination with a variable speed mechanism, of an electric motor for operating said mechanism to cause the same to drive at varying speeds, a switch for controlling the operation of said motor including an arm movable by said electric motor, switch contacts mounted on said arm, a controller arm movably mounted on said first arm, switch contacts mounted on said controller arm arranged to co-operate with the first mentioned switch contacts and means for moving said controller arm to close said switch contacts and maintain said arm in a stationary position during the movement of said first mentioned arm to cause said contacts to move to open position.

2. The combination with a variable speed mechanism, of an electric motor for operating said mechanism to cause the same to drive at varying speeds, a switch for controlling the operation of said motor including an arm movable by said electric motor, switch contacts mounted on said arm, a controller arm pivoted on said first mentioned arm, switch contacts mounted on the free end of said controller arm arranged to co-operate with the first mentioned contacts and means for swinging said arm on its pivot to close said contacts and holding the free end of said arm in a stationary position after said contacts have been closed during the movement of said first mentioned arm to cause the contacts to move to open position.

3. The combination with a variable speed mechanism, of an electric motor for operating said mechanism to cause the same to drive at varying speeds, an arm movable by said electric motor when operating said variable speed mechanism, a pair of oppositely disposed contacts mounted on said arm and movable therewith, a controller arm pivoted on said first mentioned arm, contacts mounted on the free end of said arm, said arm being swingable in opposite directions to cause opposite sets of contacts to engage and means for moving the free end of said controller arm in either direction to close said contacts and for maintaining said arm stationary, said first mentioned arm being movable by the motor in the direction toward which the controller arm is moved and arranged by said movement to open the contacts while said controller arm is held stationary.

4. The combination with a variable speed mechanism including a pair of levers for operating the same to cause the mechanism to drive at varying speeds, of an electric motor for operating said levers, a switch member mounted on one of said levers, oppositely disposed contacts mounted on said switch member, a controller arm pivoted on said switch member and having at its free ends contacts adapted to co-operate with the contacts on the switch member, means for moving the free end of the controller arm to close a set of contacts and thereby start the motor and for maintaining the free end of the controller arm stationary after the motor has started, said switch member being movable with the lever in the direction toward which the free end of the arm has been swung when the motor has started and adapted by said movement to open the contacts while the free end of the controller arm is held stationary.

In witness whereof, I HARRY C. CLAY have hereunto set my hand at Columbus, Indiana, this 19th day of February, A. D. one thousand nine hundred and twenty seven.

HARRY C. CLAY.